(12) United States Patent
Coldren et al.

(10) Patent No.: US 9,695,758 B2
(45) Date of Patent: Jul. 4, 2017

(54) FUEL SYSTEM HAVING MULTIPLE COMBUSTION MODES

(71) Applicant: Caterpillar Inc., Peoria, IL (US)

(72) Inventors: Dana Ray Coldren, Secor, IL (US); Joshua Wayne Steffen, El Paso, IL (US); Robert Michael Campion, Chillicothe, IL (US)

(73) Assignee: Caterpillar, Inc., Peoria, IL (US)

( * ) Notice: Subject to any disclaimer, the term of this patent is extended or adjusted under 35 U.S.C. 154(b) by 133 days.

(21) Appl. No.: 14/511,918

(22) Filed: Oct. 10, 2014

(65) Prior Publication Data

US 2016/0102617 A1    Apr. 14, 2016

(51) Int. Cl.
| | |
|---|---|
| F02D 19/06 | (2006.01) |
| F02M 43/00 | (2006.01) |
| F02D 41/00 | (2006.01) |
| B61C 5/00 | (2006.01) |
| B61C 17/02 | (2006.01) |
| F02D 41/30 | (2006.01) |
| F02D 19/10 | (2006.01) |

(52) U.S. Cl.
CPC ............ F02D 19/0628 (2013.01); B61C 5/00 (2013.01); B61C 17/02 (2013.01); F02D 19/061 (2013.01); F02D 19/0642 (2013.01); F02D 19/0697 (2013.01); F02D 19/10 (2013.01); F02D 41/0025 (2013.01); F02D 41/0027 (2013.01); F02D 41/3017 (2013.01); F02M 43/00 (2013.01); F02D 2200/0602 (2013.01); F02D 2200/0606 (2013.01); F02M 2200/247 (2013.01); F02M 2200/248 (2013.01); F02M 2200/95 (2013.01); Y02T 10/36 (2013.01)

(58) Field of Classification Search
CPC .... B61C 5/00; B61C 5/02; B61C 5/04; B61C 17/00; B61C 17/02; B61C 17/16; F02M 21/00; F02M 21/02; F02M 39/00; F02M 43/00; F02M 43/02; F02M 43/04; F02M 51/00; F02M 51/02; F02M 51/04
USPC .... 105/26.05, 62.1, 231, 236; 123/445, 446, 123/448, 457, 458, 472, 473
See application file for complete search history.

(56) References Cited

U.S. PATENT DOCUMENTS 5,996,558 A * 12/1999 Ouellette ................ F02D 19/10
                                                          123/27 GE
2013/0319373 A1* 12/2013 Brown .................... F02M 43/04
                                                          123/456

(Continued)

FOREIGN PATENT DOCUMENTS

| CA | 2 838 145 | 3/2014 |
|---|---|---|
| WO | WO 2013/091109 | 6/2013 |

*Primary Examiner* — R. J. McCarry, Jr.
(74) *Attorney, Agent, or Firm* — Finnegan, Henderson, Farabow, Garrett & Dunner, LLP

(57) ABSTRACT

A fuel system is disclosed that is capable of operating in multiple combustion modes. A method is also disclosed of operating a dual fuel engine in conjunction with the fuel system. The method may include detecting a performance parameter of gaseous fuel in the fuel system. The method may also include selecting a combustion mode from a plurality of combustion modes based on the performance parameter. The method may further include injecting gaseous fuel and liquid fuel into at least one cylinder of the engine according to an injection timing corresponding to the selected combustion mode.

18 Claims, 2 Drawing Sheets

(56) References Cited

U.S. PATENT DOCUMENTS

2014/0033948 A1* 2/2014 Foege .................. B61C 5/00
 105/236
2014/0123916 A1  5/2014 Coldren et al.

* cited by examiner

FUEL SYSTEM HAVING MULTIPLE COMBUSTION MODES

TECHNICAL FIELD

The present disclosure relates generally to a fuel system, and more particularly, to a fuel system having multiple combustion modes.

BACKGROUND

Gaseous fuel powered engines are common in locomotive applications. For example, the engines of a locomotive can be powered by natural gas. A preferred form of natural gas for transport with locomotives is liquefied natural gas (LNG) because of its higher energy density. The LNG can be transported in a tender car, pressurized, and heated into a gaseous state before it is delivered to a locomotive engine. The compressed natural gas (CNG) may be injected into the cylinders of the engine and ignited, such as by a spark or pilot fuel (e.g., diesel fuel). In one example, CNG is injected using high pressure direct injection (HPDI), where a high pressure pump pressurizes LNG before it is warmed to a supercritical gaseous state and then sent to an HPDI injector.

An example of a gaseous fuel powered locomotive is disclosed in PCT Application WO 2013/091109 by Melanson et al., published Jun. 27, 2013 ("the '109 reference"). The '109 reference discloses a system for supplying gaseous fuel from a tender car to an internal combustion engine on a locomotive. The system includes a fuel pump that delivers fuel from the tender car tank to an engine on the locomotive for consumption. The liquefied fuel is gasified through heating prior to reaching the engine. A controller communicates with a pressure sensor and the fuel pump to maintain a pressure of gaseous fuel in the delivery conduit at a near-constant level.

While the system of the '109 reference may allow liquefied fuel to be transported and converted to gaseous fuel for an engine, it and other similar fuel systems may suffer from certain drawbacks. In particular, fuel systems that utilize a tender car for transporting liquefied fuel (e.g., LNG), such as the system of the '109 reference, require well-insulated fuel conduits to transfer the fuel from the tender car tank, through the various pumps, and to the engine. However, even with significant insulation, fuel inside these fuel conduits may experience a change in state or pressure, such as while the fuel system is not in operation. In one example, liquefied fuel that remains in a fuel conduit and/or pump after operation of the fuel system may warm to vapor conditions (e.g., due to outside temperatures, a prolonged period of non-use, etc.), causing the pump (e.g., a high-pressure pump) to lose prime. The pump cannot be primed (and, thus, operate properly) until the vaporized fuel is purged from the system. Fuel pressure cannot be controlled without the pump first being primed.

One solution for priming the pump is sending liquefied fuel to the pump while redirecting the vaporized fuel back to the tender car tank. This solution is less than ideal, however, because it requires additional plumbing and valves, increasing costs and complexity of the system. In addition, adding the vaporized fuels to the reservoir in the tank raises the temperature of the tank and subsequently increases the risk of fuel being vented out of the tank, thus wasting fuel and polluting the environment.

The disclosed fuel system is directed to overcoming one or more of the problems set forth above and/or other problems with existing technologies.

SUMMARY

In one aspect, the present disclosure is directed to a method of operating a dual fuel engine. The method may include detecting a performance parameter of gaseous fuel in a fuel system. The method may also include selecting a combustion mode from a plurality of combustion modes based on the performance parameter. The method may further include injecting gaseous fuel and liquid fuel into at least one cylinder of the engine according to an injection timing corresponding to the selected combustion mode.

In another aspect, the present disclosure is directed to a fuel system. The fuel system may include at least one pump for receiving gaseous fuel from a tank, a liquid fuel reservoir, and at least one fuel injector fluidly connected to the at least one pump and the liquid fuel reservoir and configured to inject the gaseous fuel and the liquid fuel into at least one cylinder of the engine. The fuel system may further include a sensor configured to generate a signal indicative of a performance parameter of the gaseous fuel, and a controller. The controller may be configured to select a combustion mode from a plurality of combustion modes based on the signal, and control the at least one fuel injector to implement the selected combustion mode.

In another aspect, the present disclosure is directed to a train consist. The train consist may include a tender car and a locomotive for transporting a fuel system and a dual fuel engine including a plurality of cylinders. The fuel system may include a tank for storing liquefied gaseous fuel, a low pressure pump fluidly connected to the tank, a high pressure pump fluidly connected to the low pressure pump and configured to pressurize the liquefied gaseous fuel, and a vaporizer fluidly connected to the high pressure pump and configured to convert the liquefied gaseous fuel to a supercritical gas. The fuel system may further include a liquid fuel reservoir, an injection system configured to inject the gaseous fuel and the liquid fuel into the plurality of cylinders, and a control system. The control system may be configured to detect a pressure of the gaseous fuel and compare the pressure of the gaseous fuel to a threshold. The control system may be further configured to implement a first mode in which the gaseous fuel is injected after the liquid fuel during a combustion cycle when the pressure of the gaseous fuel is less than the first threshold, and implement a second mode in which the gaseous fuel is injected before the liquid fuel during a combustion cycle When the pressure of the gaseous fuel is greater than the first threshold.

DETAILED DESCRIPTION

Figure 1:
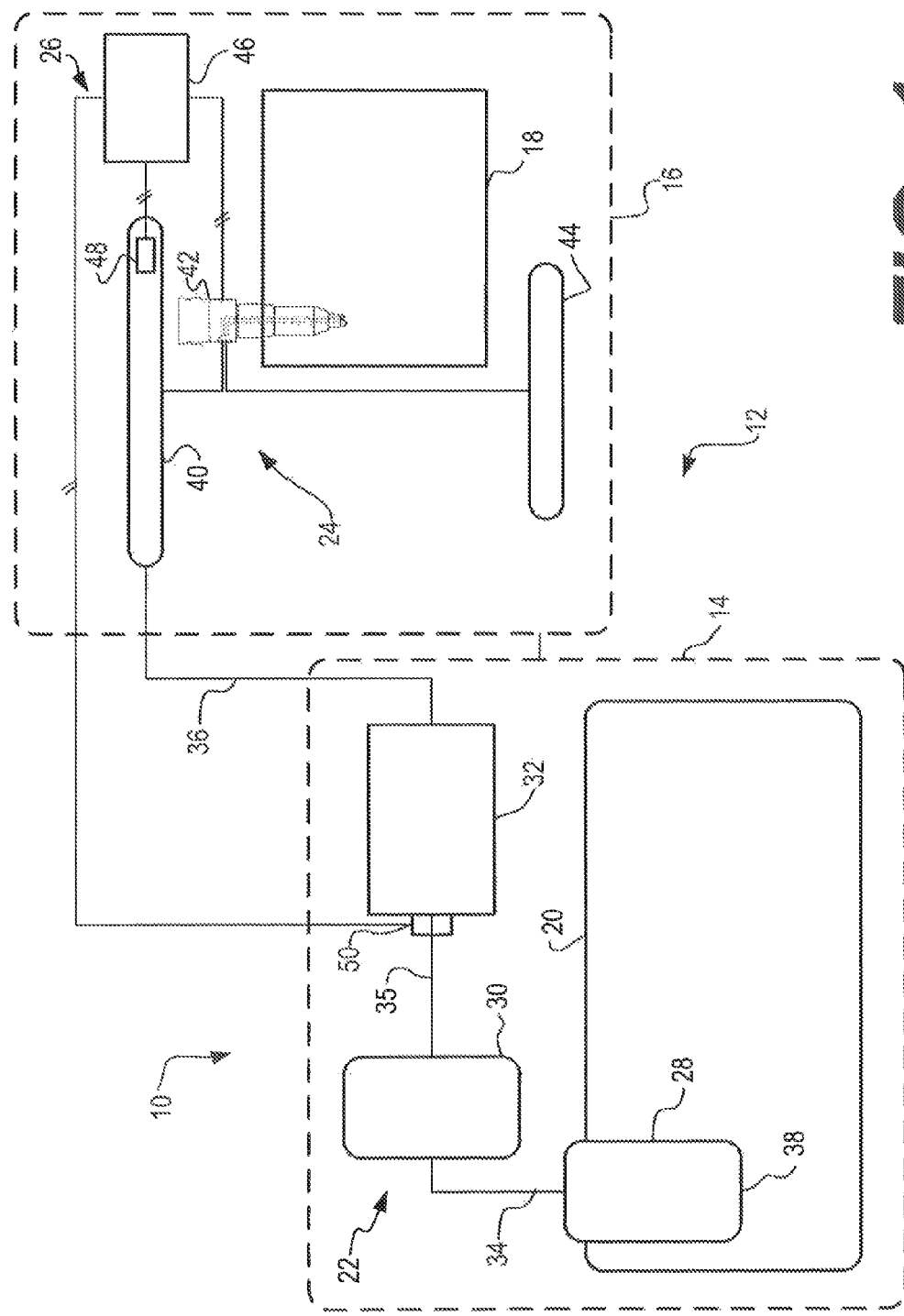
FIG. 1 is a diagrammatic illustration of an exemplary disclosed fuel system.

FIG. 1 illustrates an exemplary fuel system 10 associated with a mobile machine. In one embodiment, the mobile machine is a train consist 12 having a tender car 14 and a locomotive 16. It should be noted, however, that fuel system 10 could be associated with other mobile or stationary applications, as desired.

In an exemplary embodiment, fuel system 10 may include multiple components that cooperate to provide a pressurized gaseous fuel, such as CNG, to one or more engines 18. These components may include, among other things, a tank 20, a transfer system 22, an injection system 24, and a control system 26. Tank 20 may store liquid fuel (e.g., LNG), transfer system 22 may pump the liquid fuel out of tank 20 and convert it to a gaseous state (e.g., CNG), and injection system 24 may deliver the gaseous fuel to engine 18. Control system 26 may control one or more components of fuel system 10 to ensure fuel is delivered to engine 18 in a desired manner. Consistent with disclosed embodiments, control system 26 may control fuel system 10 such that fuel system 10 operates according to a selected one of multiple combustion modes.

Engine 18 may be a gaseous-fueled internal combustion engine. In one embodiment, engine 18 may be a sixteen-cylinder, dual fuel locomotive engine. It should be understood, however, that the disclosed embodiments may apply to other engines that utilize gaseous fuel. The disclosed dual fuel engine 18 may run on a combination of gaseous fuel (e.g., CNG) and liquid fuel (e.g., diesel fuel). For example, gaseous fuel may be injected into a combustion chamber of engine 18, which may be ignited by a relatively small amount of liquid fuel also being injected, thereby producing power. As disclosed herein, engine 18 may be configured. to run according to different combustion modes, as determined by control system 26 and executed by injection system 24.

Tank 20 may embody a. cryogenic tank located on tender car 14 and configured to hold the liquid fuel in a liquefied state. In the exemplary embodiment, tank 20 is an insulated tank that maintains a temperature of the liquid fuel at the boiling point temperature of the fuel, for example, −162° C. for LNG at standard atmospheric pressure. It is contemplated that tank 20 may be provided with conventional equipment for handling LNG, for example chillers, circulators, heaters, ventilators, filters, etc., as desired.

Transfer system 22 may include components that cooperate to transfer fuel from tank 20 to injection system 24, as well as convert the fuel from a liquid to a gas in the process. In an exemplary embodiment, transfer system 22 may include a low pressure pump 28, a high pressure pump 30, a vaporizer 32, and a plurality of fuel lines 34, 35, 36 fluidly connecting the components of transfer system 22 with each other, tank 20, and injection system 24. In some embodiments, transfer system 22 may include additional and/or alternative components, such as one or more drive motors, heat exchangers, additional fuel lines, pump sockets, etc.

Low pressure pump 28 may he configured to receive liquid fuel from tank 20 via a pump inlet 38 and pump the liquid fuel to high pressure pump 30 via fuel line 34. Low pressure pump 28 may be any pump known in the art configured to move liquid fuel from tank 20 to high pressure pump 30. For example, low pressure pump 28 may be powered by an electric drive motor and configured to move liquid fuel at approximately 1-2 MPa. As shown in FIG. 1, low pressure pump 28 may he located on tender car 14. In one example, low pressure pump may be at least partially disposed within tank 20, although other configurations are possible. Further, it should be understood that low pressure pump 28 may he located elsewhere from tender car 14, such as on locomotive 16 or another train car. Fuel line 34 may be a cryogenic fuel line configured to allow cold liquid fuel (e.g., LNG) to pass therethrough. Fuel line 34 may be an external feel line that runs outside of low pressure pump 28 and high pressure pump 30.

High pressure pump 30 may receive liquid fuel from low pressure pump 28, pressurize the liquid fuel, and deliver the pressurized fuel to vaporizer 32 via fuel line 35. High pressure pump 30 may be any pump known in the art configured to pressurize liquid fuel and deliver it to vaporizer 32. For example, high pressure pump 30 may be a vacuum-jacketed pump powered by an electric drive motor, configured to pressurize the liquid fuel to approximately 35-40 MPa. As shown in FIG. 1, high pressure pump 30 may be located on tender car 14, but it should be understood that high pressure pump 30 is not limited to this location. Fuel line 35 may be an external cryogenic fuel line configured to allow pressurized liquid fuel to pass therethrough. In some embodiments, high pressure pump 30 and vaporizer 32 may be directly attached units such that fuel line 35 is an internal fuel line or omitted altogether.

Vaporizer 32 may he a heat exchanging device configured to heat the pressurized liquid fuel, converting the fuel to a gaseous state. For example, vaporizer 32 may be a heat exchanger con figured to facilitate heat transfer from a heat source (e.g., engine coolant that has been heated by the engine) to the fuel. Vaporizer 32 may heat the fuel at a substantially constant pressure (e.g., 35-40 MPa), converting pressurized liquid fuel (e.g., to supercritical gaseous fuel (e.g., CNG), which may be suitable for high pressure direct injection into the cylinders of engine 18.

Gaseous fuel may be directed from vaporizer 32 to injection system 24 through fuel line 36. In an exemplary embodiment, fuel line 36 may be a conduit configured to allow supercritical gaseous fuel to pass therethrough. As shown in FIG. 1, fuel line 36 may connect tender car 14 to locomotive 16, thereby transporting fuel across cars of locomotive consist 12. Injection system 24 may receive the gaseous fuel and direct it to engine 18 in a manner determined by control system 26.

In an exemplary embodiment, injection system 24 may include a gaseous fuel rail 40 and a plurality of fuel injectors 42 (only one shown). Gaseous fuel rail 40 may be a fuel storage system, such as a common rail, accumulator, or similar component, configured to maintain a supply of pressurized gaseous fuel for injection by fuel injectors 42. Fuel injectors 42 may be individual valves for selectively and cyclically delivering a predetermined amount of gaseous fuel to the cylinders of engine 18 for subsequent combustion.

In the embodiment of FIG. 1, fuel injector 42 may be a dual fuel injector configured to inject gaseous fuel and liquid fuel out of different injection nozzles. For example, fuel injector 42 may utilize a liquid fuel (e.g., diesel fuel) as a hydraulic fluid for controlling a gaseous fuel valve (i.e., a valve that, when opened, allows gaseous fuel to enter a cylinder). In an exemplary embodiment, injection system 24 may also include a liquid fuel reservoir 44 (e.g., a pressurized rail, tank, or combination or the two) which supplies liquid fuel to fuel injector 42 for hydraulic control of fuel injector 42 and injection into engine 18.

During operation, fuel injectors 42 may inject gaseous fuel and liquid fuel into the cylinders of engine 18 according to a control strategy implemented by control system 26. For example, control system 26 may selectively open and/or close a valve inside fuel injectors 42 to control a timing and duration of an injection of gaseous fuel and injection of liquid fuel. Engine 18 may cause combustion of the fuels in the cylinders, as will be described in. more detail.

In an exemplary embodiment, control system 26 may include a controller 46 and one or more sensors 48, 50. Controller 46 may electronically communicate with sensors 48, 50 to determine one or more performance parameters of fuel system 10 and/or engine 18. Controller 46 may also electronically communicate with fuel injectors 42, such as to open and/or close one or more valves to inject gaseous fuel and/or liquid fuel into engine 18. Controller 46 may include one or more processors configured to execute software instructions (e.g., one or more programs) to implement a control strategy, combustion mode, injection timing, etc. associated with fuel system 10.

Sensors 48, 50 may be electronic sensors configured to generate signals indicative of one or more performance parameters associated with operation of fuel system 10 and/or engine 18. In an exemplary embodiment sensor 48 may be a pressure sensor and sensor 50 may be a temperature sensor. In the embodiment of FIG. 1, pressure sensor 48 may be positioned and configured to measure a pressure of gaseous fuel in gaseous fuel rail 40 and temperature sensor 50 may be positioned and configured to measure a temperature of liquid fuel at the inlet to vaporizer 32. In some embodiments, controller 46, pressure sensor 48, and temperature sensor 50 may be part of a fuel conditioning module for regulating the pressure of gaseous fuel in gaseous fuel rail 40 and sensing temperature and pressure of the fuel. It should be understood, however, that sensors 48, 50 may he configured and/or positioned in other manners.

As described herein, control system 26 may control fuel system 10 to appropriately deliver gaseous fuel, such as CNG, and liquid fuel, such as diesel fuel, to engine 18 for combustion. Also as described, one fuel injector 42 may include two nozzles for injecting gaseous fuel and liquid fuel, respectively, into one cylinder, although other configurations are possible (e.g., separate fuel injectors for gaseous fuel and liquid fuel). In an exemplary embodiment, control system 26 may be configured to control fuel injectors 42 to inject gaseous fuel and diesel fuel according to a selected one of a plurality of combustion modes, depending on parameters determined by one or more of sensors 48, 50.

Figure 2:
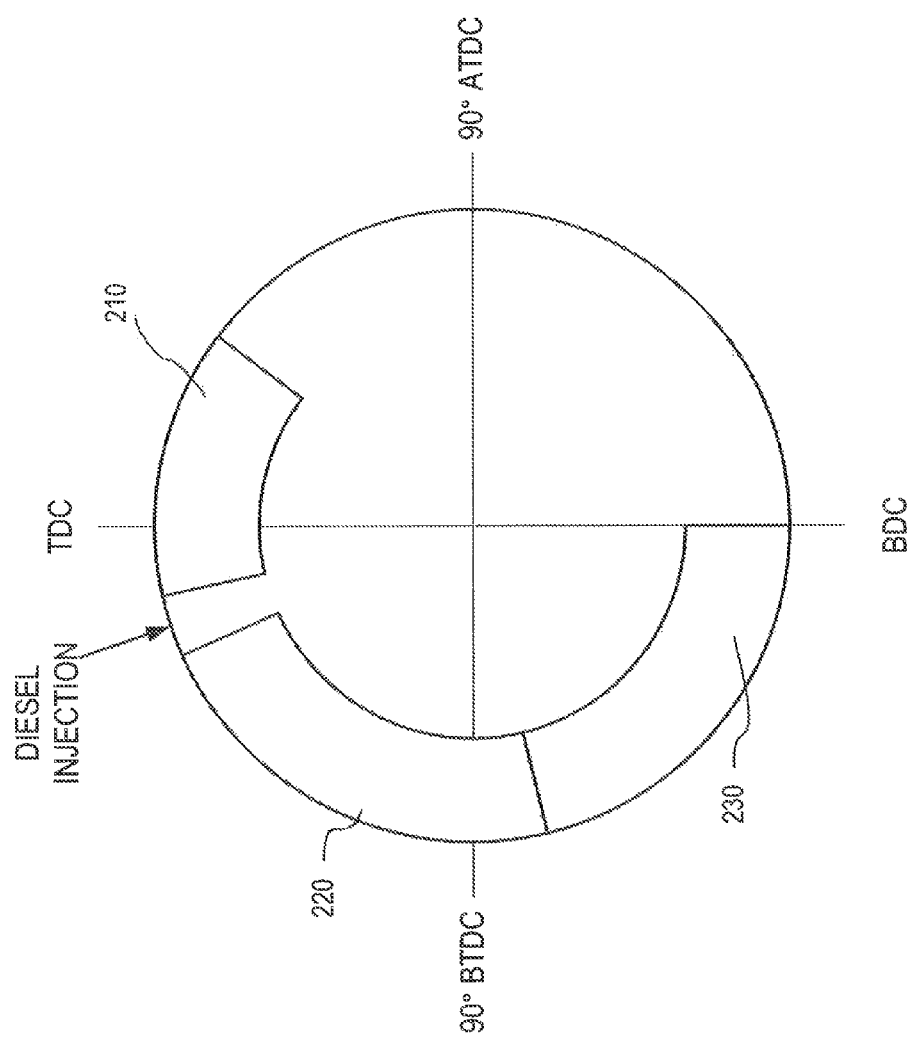
FIG. 2 is an illustration of exemplary disclosed injection timings corresponding to various combustion modes that may be implemented by the fuel system of FIG. 1.

In an exemplary embodiment, control system 26 may be configured to select between a high pressure direct injection (HPDI) mode and at least one gas blending mode. In the HPDI mode, high pressure gaseous fuel is injected after a liquid fuel injection, igniting at some point during compression of the fuels. In the gas blending mode(s), gaseous fuel is injected and mixed with air in the cylinder, and a subsequent injection of liquid fuel ignites the air/gaseous fuel mixture. In some embodiments, control system 26 may be configured to select between at least two dynamic gas blending modes, including a direct injection-dynamic gas blending (DI-DGB) and a dynamic gas blending (DOB) mode. FIG. 2 illustrates at least some of the combustion modes that may be implemented by injection system 24 and control system 26. These combustion modes and exemplary control processes for implementing the various combustion modes are described in more detail below.

INDUSTRIAL APPLICABILITY

The disclosed fuel system is applicable to any gaseous fuel engine that may have use for multiple combustion modes. The disclosed fuel system may have particular application to dual-fuel engines that operate by consuming both gaseous fuel (e.g., CNG) and liquid fuel (e.g., diesel fuel). The disclosed fuel system may utilize a dual fuel injector that uses liquid fuel pressure to open and close a valve that introduces the gaseous fuel into the engine. In this way, changes in gaseous fuel pressure do not affect operation of the fuel injector, and, thus, the fuel injector can operate according to multiple operating modes that are selected based on a pressure of the gaseous fuel.

The disclosed fuel system may be particularly useful for fuel systems that include gaseous fuel that is stored as a liquefied gaseous fuel (e.g., LNG) and later converted to pressurized gaseous fuel (e.g., CNG) for injection into the engine. These types of fuel systems may be susceptible to losses in fuel pressure under certain conditions. For example, certain situations may arise in which liquefied gaseous fuel is "warmed" unintentionally. For instance, liquefied fuel that remains in the fuel lines and pumps of the fuel system during extended idle or shutdown time may warm to vapor conditions. This unintentional warming may cause the fuel system pump the high pressure pump) to lose prime. The unprimed pump cannot pressurize the warmed gaseous fuel, and thus, the vapors must be purged so that cold, liquefied gaseous fuel can be delivered to prime the pump. Instead of sending the warmed gaseous fuel back to the tank, the disclosed fuel system may employ a combustion mode that can use the gaseous fuel until the pump is primed.

FIG. 2 depicts exemplary timing ranges associated with multiple combustion modes that injection system. 24 and control system 26 may he configured to implement. For example, FIG. 2 depicts exemplary timings of gaseous fuel injections according to an HPDI mode 210, a DI-DGB mode 220, and a DGB mode 230. In each mode, the components of engine 18 may operate in a conventional manner, including a piston reciprocating between a top dead center (TDC) position and a bottom dead center (BDC) position in each cylinder to change the volume of a combustion chamber, cause combustion of fuel therein, and thereby move through a compression/exhaust stroke (from BDC to TDC) and a power/intake stroke (from TDC to BDC).

In an exemplary embodiment, HPDI 210 mode may be a mode in which high pressure gaseous fuel is injected into the cylinders of engine 18 after an injection of a small amount of liquid fuel (e.g., diesel fuel). For example, mode 210 may include an injection of liquid fuel at a time when a piston is between approximately 30° before TDC (BTDC) and approximately TDC, and a subsequent injection of gaseous fuel at a time when the piston is between approximately 15° BTDC and approximately 40° after top dead center (ATDC). In one embodiment, the high pressure gaseous fuel may be approximately 35-40 MPa, allowing the fuel to overcome peak cylinder pressures and be injected near TDC. In one implementation, HPDI 210 mode may be a primary operating mode for fuel system 10, since it may be capable of producing enough power to meet operating loads placed on engine 18.

DI-DGB mode 220 and DGB mode 230 may be gas blending modes that may he selectively implemented by fuel system 10. DI-DGB and DGB modes 220, 230 may be similar in that each mode may include an injection of gaseous fuel at a time during the combustion cycle that occurs before the injection of liquid fuel. In an exemplary embodiment, the injection of liquid fuel in the dual blending modes may occur at approximately the same or similar time as with HPDI mode 210, which may be when the piston is between approximately 30° BTDC and approximately TDC. It should he understood, however, that other timings are possible.

DI-DGB mode 220 may differ from DGB mode 230, however, in that the injection of gaseous fuel in DI-DGB mode 220 may occur later in the combustion cycle than in DGB mode 230. In an exemplary embodiment, DI-DGB mode 220 may include an injection of gaseous fuel at a time during the combustion cycle when the piston is between approximately 180° before top dead center and approximately 100° before top dead center. DGB mode 230, on the other hand, may include an injection of gaseous fuel at a time during the combustion cycle when the piston is between approximately 100° before top dead center and approximately 30° before top dead center.

As has been described, HPDI mode 210 may be a high pressure injection mode, while DI-DGB mode 220 and DGB mode 230 may be lower pressure modes. For example, DI-DGB mode 220 may be a medium pressure injection mode (e.g., approximately 2-20 MPa) that includes injection of gaseous fuel after intake valves close and before cylinder pressure reaches peak levels. DGB mode 230 may be a relatively low pressure injection mode (e.g., approximately 0.2-2 MPa) that includes an injection of gaseous fuel very early in the compression/exhaust stroke. Since each mode may relate to a pressure of the gaseous fuel, control system 26 may monitor the pressure to determine which mode should be used. In general, the fuel pressure should be approximately 2 times greater than a cylinder pressure at the time of injection. The disclosed approach of using different combustion modes for different situations helps maintain this relationship and is therefore useful in the scenario in which gaseous fuel is unintentionally warmed, causing a pressure loss and a temporary inability to pressurize gaseous fuel (e.g., due to the pump losing prime).

Control system 26 may execute a control process by which a mode of the multiple combustion modes is selected to accommodate certain conditions. In an exemplary embodiment, control system 26 may perform the process to monitor one or more performance parameters of gaseous fuel in fuel system 10 and implement a selected combustion mode based on the performance parameters. For example, controller 46 may electronically communicate with sensors 48, 50 and fuel injectors 42 to perform the control process.

Controller 46 may first monitor a temperature of gaseous fuel in fuel system 10 to determine if high pressure pump 30 is primed. For example, temperature sensor 50 may generate a signal indicative of a temperature of gaseous fuel at a particular location in fuel system 10, which may be received by controller 46. In an exemplary embodiment, temperature sensor 50 may be positioned and configured to generate a signal indicative of a temperature of gaseous fuel at an inlet to vaporizer 32. In other embodiments, temperature sensor 50 may measure a temperature of gaseous fuel elsewhere in fuel system 10 (e.g., fuel line 34). It should be understood that the temperature of gaseous fuel may correspond to a temperature of gaseous fuel in a gaseous state, liquefied state, or a temperature of a component in contact with the gaseous fuel (e.g., high pressure pump 30).

Controller 46 may compare the measured temperature to a threshold value. The threshold value may be selected such that temperatures greater than the threshold value indicate that high pressure pump 30 is not primed. In an exemplary embodiment, the threshold value may be approximately −140° C. If the measured temperature is less than the threshold value, high pressure pump 30 may be primed and HPDI mode 210 may be implemented after pressurization of fuel in gaseous fuel rail 40. If the measured temperature is greater than the threshold value, however, high pressure pump 30 may not be primed, and it cannot yet be operated to pressurize liquefied gaseous fuel. Controller 46 may then determine which of multiple combustion modes to implement until the high pressure pump 30 can be used to pressurize the fuel.

In an exemplary embodiment, controller 46 may monitor a gaseous fuel pressure in fuel system 10. For example, pressure sensor 48 may generate a signal indicative of a pressure of gaseous fuel in fuel system 10, which may be received by controller 46. In one embodiment, pressure sensor 48 may be positioned and configured to generate a signal indicative of a pressure in gaseous fuel rail 40. In other embodiments, pressure sensor 48 may measure a pressure elsewhere in fuel system 10 (e.g., at or near high pressure pump 30).

Controller 46 may compare the pressure to one or more threshold values. In an exemplary embodiment, a first threshold value may be a value less than which HPDI mode 210 is not suitable for use. For example, the first threshold value may be approximately 20 MPa. If the measured pressure is greater than the threshold value, controller 46 may communicate with fuel injectors 42 to implement HPDI mode 210.

If, however, the measured pressure is less than the first threshold value, controller 46 may communicate with fuel injectors 42 to implement a gas blending mode. For example, controller 46 may implement DI-DGB mode 220 or DGB mode 230. To determine which of these modes to implement, controller 46 may compare the measured pressure to a second threshold value. If the measured pressure is greater than the second threshold value, DI-DGB mode 220 may be selected and implemented. If the measured pressure is less than the second threshold value, DGB mode 230 may be selected and implemented. In an exemplary embodiment, the second threshold value may be approximately 2 MPa.

In disclosed embodiments, implementation of any of the combustion modes while high pressure pump 30 is not primed may correspond to a situation in which gaseous fuel in high pressure pump 30 and the adjacent fuel lines 34, 35, 36 has unintentionally warmed to vapor conditions. This may have caused high pressure pump 30 to lose prime. In order to re-prime high pressure pump 30, the lower pressure gaseous fuel vapors may be directed to injection system 24 for consumption by engine 18. With high pressure pump 30 not primed, low pressure pump 28 may operate to push the vapors directly through high pressure pump 30 and vaporizer 32 and into gaseous fuel rail 40, where it may be injected by fuel injectors 42. Further, since fuel injectors 42 may be operated by liquid fuel from liquid fuel reservoir 44 (which may store liquid fuel at higher temperatures and, thus, is less susceptible to fluctuations in pressure), the change in pressure of the gaseous fuel may not have a large effect on the ability of fuel injectors 42 to inject gaseous fuel.

As injection system 24 operates in the selected combustion mode, control system 26 may continue to monitor performance parameters, such as to determine when high pressure pump 30 has been primed. As injection system 24 operates with high pressure pump 30 unprimed, low pressure pump 28 may deliver cold, liquefied gaseous fuel to high pressure pump 30 to replace the warmed gaseous fuel sent to engine 18. Eventually, the liquefied gaseous fuel will re-prime high pressure pump 30 such that it may operate to pressurize the gaseous fuel. Control system 26 may continue to monitor a temperature of gaseous fuel near high pressure pump 30 to determine when high pressure pump 30 is primed and, thus, pressurization may be started.

Controller 46 may again compare the measured temperature to a threshold value. The threshold value may be selected such that temperatures less than the threshold value indicate that high pressure pump 30 is primed. In some embodiments, the threshold value ma be the same as the threshold value used to initially determine whether high pressure pump 30 had lost prime (e.g., −140° C.), although another threshold value may be used. If the measured temperature is above the threshold value, high pressure pump 30 may not yet be primed, and unprimed operation should continue. When the measured temperature is less than the threshold value, high pressure pump 30 may begin pressurizing the liquefied gaseous fuel and, when a sufficient pressure in gaseous fuel rail 40 is reached, HPDI mode 210 may be implemented (or continued with higher-pressure fuel). Fuel system 10 may thereafter operate in HPDI mode 210 to meet the various load requirements of engine 18.

The above-described control process may be implemented to allow a dual fuel engine to operate in different combustion modes, thereby allowing the fuel system and engine to adapt to changing conditions. The control process may be particularly useful when applied to a locomotive consist that transports liquefied gaseous fuel on a separate car from a locomotive. This arrangement may require longer and/or external fuel lines, which may be susceptible to allowing fuel held therein to be unintentionally warmed. The disclosed embodiments allow the warmed fuel to be consumed by the engine, obviating the need for additional fuel lines to route the fuel back to the tank and reducing emissions. However, while particularly useful for of locomotive applications, it should be understood that other gaseous fuel engines may benefit from the availability of multiple combustion modes, such as to accommodate differing load requirements.

It will be apparent to those skilled in the art that various modifications and variations can be made to the disclosed fuel system. Other embodiments will be apparent to those skilled in the art from consideration of the specification and practice of the disclosed concepts. It is intended that the specification and examples be considered as exemplary only, with a true scope being indicated by the following claims and their equivalents.

What is claimed is:

1. A method of operating a dual fuel engine, comprising:
   detecting a performance parameter of gaseous fuel in a fuel system;
   selecting a combustion mode from a plurality of combustion modes based on the performance parameter,
      wherein the plurality of combustion modes include a first mode in which the gaseous fuel is injected after the liquid fuel during a combustion cycle and at least one second mode in which the gaseous fuel is injected before the liquid fuel during a combustion cycle, and
      wherein the first mode includes injecting the gaseous fuel at a time during the combustion cycle when a piston is between 15° before top dead center and 40° after top dead center; and
   injecting gaseous fuel and liquid fuel into at least one cylinder of the engine according to an injection timing corresponding to the selected combustion mode.

2. The method of claim 1, wherein a pressure of the gaseous fuel injected into the at least one cylinder in the first mode is greater than a pressure of the gaseous fuel injected into the at least one cylinder in the second mode.

3. The method of claim 1, wherein the at least one second mode includes injecting the gaseous fuel at a time during the combustion cycle when the piston is between 180° before top dead center and 30° before top dead center.

4. The method of claim 1, wherein the at least one second mode includes at least two modes including a first gas blending mode and a second gas blending mode.

5. The method of claim 4, wherein:
   the first gas blending mode includes injecting the gaseous fuel at a time during the combustion cycle when a piston is between 180° before top dead center and 100° before top dead center, and
   the second gas blending mode includes injecting the gaseous fuel at a time during the combustion cycle when the piston is between 100° before top dead center and 30° before top dead center.

6. The method of claim 1, wherein detecting the performance parameter includes measuring a pressure of the gaseous fuel.

7. The method of claim 6, further including implementing the at least one second mode based on the pressure of the gaseous fuel being below a first threshold.

8. The method of claim 7, wherein the at least one second mode includes a first blending mode and a second blending mode, and further including implementing the first blending mode if the pressure is below a second threshold and implementing the second blending mode if the pressure is above the second threshold.

9. The method of claim 7, further including:
   detecting a second performance parameter;
   pressurizing the gaseous fuel based on the second performance parameter; and
   implementing the first mode to inject the pressurized gaseous fuel.

10. The method of claim 9, wherein detecting the second performance parameter includes detecting a temperature of the gaseous fuel.

11. A fuel system for a dual fuel engine, comprising:
    at least one pump for receiving gaseous fuel from a tank;
    a liquid fuel reservoir;
    at least one fuel injector fluidly connected to the at least one pump and the liquid fuel reservoir and configured to inject the gaseous fuel and the liquid fuel into at least one cylinder of the engine;
    a sensor configured to generate a signal indicative of a performance parameter of the gaseous fuel; and
    a controller configured to:
       select a combustion mode from a plurality of combustion modes based on the signal, and
       control the at least one fuel injector to implement the selected combustion mode.

12. The fuel system of claim 11, wherein the at least one fuel injector is a dual fuel injector with a first nozzle for injecting the gaseous fuel and a second nozzle for injecting the liquid fuel.

13. The fuel system of claim 12, wherein the at least one fuel injector is configured to use a pressure of the liquid fuel to open and close a valve that delivers the gaseous fuel to the first nozzle.

14. The fuel system of claim 11, wherein the plurality of combustion modes include a first mode in which the gaseous fuel is injected after the liquid fuel during a combustion cycle and at least one second mode in which the gaseous fuel is injected before the liquid fuel during a combustion cycle.

15. The fuel system of claim 14, wherein the sensor is a pressure sensor and the performance parameter is a pressure of the gaseous fuel.

16. The fuel system of claim 15, further including a gaseous fuel rail connected between the at least one pump and the at least one fuel injector, and the performance parameter is a pressure of gaseous fuel in the gaseous fuel rail.

17. The fuel system of claim 15, further including a temperature sensor configured to generate a signal indicative of a temperature of the gaseous fuel, and wherein the controller is configured to:
   implement the at least one second mode based on the pressure of the gaseous fuel being below a first threshold;
   pressurize the gaseous fuel when the temperature decreases below a second threshold; and
   implement the first mode when the pressure increases above the first threshold.

18. A train consist, comprising:
   a tender car including a tank configured to store liquefied gaseous fuel;
   a locomotive including a dual fuel engine having a plurality of cylinders; and
   a fuel system, the fuel system comprising:
      the tank;
      a low pressure pump fluidly connected to the tank;
      a high pressure pump fluidly connected to the low pressure pump and configured to pressurize the liquefied gaseous fuel;
      a vaporizer fluidly connected to the high pressure pump and configured to convert the liquefied gaseous fuel to a supercritical gas;
      a liquid fuel reservoir;
      an injection system configured to inject the gaseous fuel and the liquid fuel into the plurality of cylinders; and
      a control system configured to:
         detect a pressure of the gaseous fuel;
         compare the pressure of the gaseous fuel to a threshold;
         implement a first mode in which the gaseous fuel is injected after the liquid fuel during a combustion cycle when the pressure of the gaseous fuel is less than the first threshold, and
         implement a second mode in which the gaseous fuel is injected before the liquid fuel during a combustion cycle when the pressure of the gaseous fuel is greater than the first threshold.

\* \* \* \* \*